United States Patent
Johnson et al.

(10) Patent No.: US 7,457,734 B2
(45) Date of Patent: Nov. 25, 2008

(54) REPRESENTATION OF WHIRL IN FIXED CUTTER DRILL BITS

(75) Inventors: Simon Johnson, Bristol (GB); Brian Peter Jarvis, Chipping Sodbury (GB)

(73) Assignee: ReedHycalog UK Limited (GB)

( * ) Notice: Subject to any disclaimer, the term of this patent is extended or adjusted under 35 U.S.C. 154(b) by 111 days.

(21) Appl. No.: 11/548,706

(22) Filed: Oct. 12, 2006

(65) Prior Publication Data

US 2007/0144789 A1    Jun. 28, 2007

(30) Foreign Application Priority Data

Oct. 25, 2005    (GB)    ................. 0521693.2

(51) Int. Cl.
    *G06G 7/48* (2006.01)
(52) U.S. Cl. .......................... 703/7; 175/327
(58) Field of Classification Search ........... 703/6
    See application file for complete search history.

(56) References Cited

U.S. PATENT DOCUMENTS

| | | | |
|---|---|---|---|
| 1,587,266 A | 6/1926 | Zublin |
| 2,074,951 A | 3/1937 | Zublin |
| 2,687,282 A | 8/1954 | Sanders |
| 2,712,434 A | 7/1955 | Giles et al. |
| 2,931,630 A | 4/1960 | Grady |
| 3,120,285 A | 2/1964 | Rowley et al. |
| 3,156,310 A | 11/1964 | Frisby |
| 3,215,215 A | 11/1965 | Kellner |
| 3,455,402 A | 7/1969 | Tiraspolsky |
| 3,851,719 A | 12/1974 | Thompson et al. |
| 3,923,109 A | 12/1975 | Williams, Jr. |
| 4,220,213 A | 9/1980 | Hamilton |
| 4,449,595 A | 5/1984 | Holbert |
| 4,463,220 A | 7/1984 | Gonzalez |
| 4,471,845 A | 9/1984 | Jurgens |
| 4,499,958 A | 2/1985 | Radtke et al. |
| 4,515,227 A | 5/1985 | Cerkovnik |
| 4,523,652 A | 6/1985 | Schuh |
| 4,602,691 A | 7/1986 | Weaver |
| 4,635,738 A | 1/1987 | Schillinger et al. |
| 4,640,375 A | 2/1987 | Barr et al. |

(Continued)

FOREIGN PATENT DOCUMENTS

GB    2400696 A    10/2004

(Continued)

OTHER PUBLICATIONS

Hanson et al., "Dynamics Modeling of PDC Bits", SPE/IADC 29401, SPE/IADC Drilling Conference, Feb. 28-Mar. 2, 1995.*

(Continued)

*Primary Examiner*—Paul L Rodriguez
*Assistant Examiner*—Mary C Jacob
(74) *Attorney, Agent, or Firm*—Jeffrey E. Daly

(57) ABSTRACT

Disclosed is a method of comparing the relative lateral stability among drill bits (that is, the tendency for a bit to whirl). This allows improved bit selection in applications where whirl is apparent. Because there will likely be many different acceptable bit designs produced by the above method, the comparison of the regenerative forces among these bits allows a customer to make a more informed choice between stability and other performance features among a range of bit designs.

6 Claims, 4 Drawing Sheets

U.S. PATENT DOCUMENTS

| | | |
|---|---|---|
| 4,696,354 A | 9/1987 | King et al. |
| 4,699,224 A | 10/1987 | Burton |
| 4,718,505 A | 1/1988 | Fuller |
| 4,815,342 A | 3/1989 | Brett et al. |
| 4,889,017 A | 12/1989 | Fuller et al. |
| 4,895,214 A | 1/1990 | Schoeffler |
| 4,948,925 A | 8/1990 | Winters et al. |
| 4,982,802 A | 1/1991 | Warren et al. |
| 5,010,789 A | 4/1991 | Brett et al. |
| 5,042,596 A | 8/1991 | Brett et al. |
| 5,090,492 A | 2/1992 | Keith |
| 5,099,934 A | 3/1992 | Barr |
| 5,099,935 A | 3/1992 | Anthon et al. |
| 5,111,892 A | 5/1992 | Sinor et al. |
| 5,113,953 A | 5/1992 | Noble |
| 5,119,892 A | 6/1992 | Clegg et al. |
| 5,131,478 A | 7/1992 | Brett et al. |
| 5,165,494 A | 11/1992 | Barr |
| 5,186,268 A | 2/1993 | Clegg |
| 5,213,168 A | 5/1993 | Warren et al. |
| 5,238,075 A | 8/1993 | Keith et al. |
| 5,265,685 A | 11/1993 | Keith et al. |
| 5,314,033 A | 5/1994 | Tibbitts |
| 5,377,773 A | 1/1995 | Tibbitts |
| 5,402,856 A | 4/1995 | Warren et al. |
| 5,423,389 A | 6/1995 | Warren et al. |
| 5,469,927 A | 11/1995 | Griffin |
| 5,531,281 A | 7/1996 | Murdock |
| 5,558,170 A | 9/1996 | Thigpen et al. |
| 5,560,439 A | 10/1996 | Delwiche et al. |
| 5,560,440 A | 10/1996 | Tibbitts |
| 5,568,838 A | 10/1996 | Struthers et al. |
| 5,601,151 A | 2/1997 | Warren |
| 5,617,926 A | 4/1997 | Eddison et al. |
| 5,649,604 A | 7/1997 | Fuller et al. |
| 5,651,421 A | 7/1997 | Newton et al. |
| 5,678,644 A | 10/1997 | Fielder |
| 5,697,461 A | 12/1997 | Newton et al. |
| 5,740,873 A | 4/1998 | Tibbitts |
| 5,765,653 A | 6/1998 | Doster et al. |
| 5,803,196 A | 9/1998 | Fielder |
| 5,864,058 A | 1/1999 | Chen |
| 5,873,422 A | 2/1999 | Hansen et al. |
| 5,937,958 A | 8/1999 | Mensa-Wilmot et al. |
| 5,957,223 A | 9/1999 | Doster et al. |
| 5,957,227 A | 9/1999 | Besson et al. |
| 5,979,571 A | 11/1999 | Scott et al. |
| 5,979,576 A | 11/1999 | Hansen et al. |
| 5,992,548 A | 11/1999 | Silva et al. |
| 6,006,844 A | 12/1999 | Van Puymbroeck et al. |
| 6,092,610 A | 7/2000 | Kosmala et al. |
| 6,102,142 A | 8/2000 | Besson et al. |
| 6,109,372 A | 8/2000 | Dorel et al. |
| 6,116,356 A | 9/2000 | Doster et al. |
| 6,123,161 A | 9/2000 | Taylor |
| 6,158,529 A | 12/2000 | Dorel |
| 6,164,394 A | 12/2000 | Mensa-Wilmot et al. |
| 6,173,797 B1 | 1/2001 | Dykstra et al. |
| 6,186,251 B1 | 2/2001 | Butcher |
| 6,193,000 B1 | 2/2001 | Caraway et al. |
| 6,246,974 B1 | 6/2001 | Jelley et al. |
| 6,260,636 B1 | 7/2001 | Cooley et al. |
| 6,269,893 B1 | 8/2001 | Beaton et al. |
| 6,283,233 B1 | 9/2001 | Lamine et al. |
| 6,290,007 B2 | 9/2001 | Beuershausen et al. |
| 6,298,930 B1 | 10/2001 | Sinor et al. |
| 6,302,224 B1 | 10/2001 | Sherwood, Jr. |
| 6,321,857 B1 | 11/2001 | Eddison |
| 6,321,862 B1 | 11/2001 | Beuershausen et al. |
| 6,328,117 B1 | 12/2001 | Berzas et al. |
| 6,349,780 B1 | 2/2002 | Beuershausen |
| 6,371,226 B1 | 4/2002 | Caraway |
| 6,408,958 B1 | 6/2002 | Isbell et al. |
| 6,450,270 B1 | 9/2002 | Saxton |
| 6,460,631 B2 | 10/2002 | Dykstra et al. |
| 6,481,511 B2 | 11/2002 | Matthias et al. |
| 6,564,886 B1 | 5/2003 | Mensa-Wilmot et al. |
| 6,568,492 B2 | 5/2003 | Thigpen et al. |
| 6,595,304 B2 | 7/2003 | Chen |
| 6,622,803 B2 | 9/2003 | Harvey et al. |
| 6,659,199 B2 | 12/2003 | Swadi |
| 6,705,413 B1 | 3/2004 | Tessari |
| 6,739,416 B2 | 5/2004 | Presley et al. |
| 6,779,613 B2 | 8/2004 | Dykstra et al. |
| 2004/0221985 A1* | 11/2004 | Hill et al. ............... 166/250.01 |
| 2004/0254664 A1* | 12/2004 | Centala et al. ............. 700/97 |
| 2005/0015229 A1 | 1/2005 | Huang |
| 2007/0093996 A1* | 4/2007 | Cariveau et al. ............ 703/7 |

FOREIGN PATENT DOCUMENTS

GB  2422462 A  7/2006

OTHER PUBLICATIONS

Bayly et al, "Low-Frequency Regerative Vibration and the Formation of Lobed Holes in Drilling" Journal of Manufacturing Science and Engineering, vol. 124, May 2002.*

Johnson, S., "A New Method of Producing Laterally Stable PDC Drill Bits", IADC/SPE Drilling Conference, Feb. 21-23, 2006.*

Cooley et al, "The Design and Testing of Anti-Whirl Bits", 67th Annual Technical Conference and Exhibition of the Society of Petroleum Engineers, Washington DC, Oct. 4-7, 1992.*

Kenner et al, "Dynamic Analysis Reveals Stability of Roller Cone Rock Bits", SPE 69th Annual Technical Conference and Exhibition, Sep. 25-28, 1994.*

J.Ford Brett; Thomas M. Warren; Suzanne M. Behr: Bit Whirl—A New Theory of PDC Bit Failure; SPE 19571; Drilling Engineering, Dec. 1990, p. 275.

Thomas M. Warren; J.Ford Brett;L. Allen Sinor; Development of a Whirl-Resistant Bit; SPE 19572; Drilling Engineering, Dec. 1990; p. 267.

G.E. Weaver and R.I. Clayton; A New PDC Cutting Structure Improves Bit Stabilization and Extends Application Into Harder Rock Types; SPE/IADC 25734; 1993.

Graham Mensa-Wilmot ans Tony Krepp; Innovative Cutting Structure Improves Stability and Penetration Rate of PDC Bits Without Sacrificing Durability; SPE/IADC 39310; 1998.

* cited by examiner

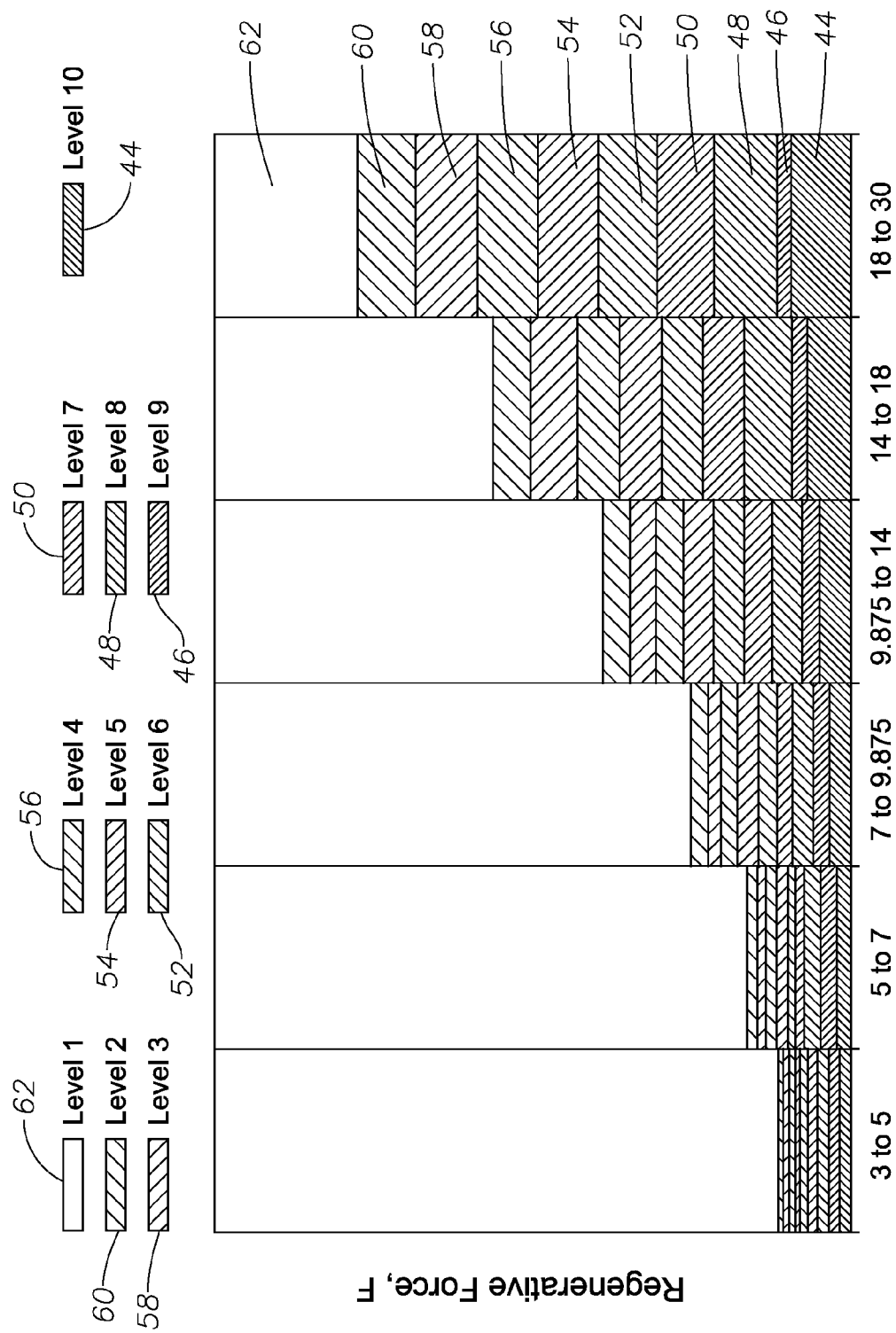

REPRESENTATION OF WHIRL IN FIXED CUTTER DRILL BITS

This application claims priority from GB Patent Application, Serial No. 0521693.2, filed on Oct. 25, 2005.

BACKGROUND OF THE INVENTION

1. Field of the Invention

The invention relates to fixed cutter drill bits for drilling boreholes into the earth for the exploration and recovery of minerals, particularly petroleum and natural gas.

2. Description of the Related Art

Bit whirl has been documented as a major cause of early failure and reduced performance of PDC bits. To date numerous methods have been developed with the aim of eliminating bit whirl. These methods include summing the resultant forces from each PDC cutter on a drill bit and balancing them to give a low net resultant force, known as an Out of Balance force. This was further developed by Warren et al in two related publications ("Bit Whirl, a New Theory of PDC bit Failure"—J. Ford Brett, Thomas F. Warren, and Suzanne M. Behr; Society of Petroleum Engineers (SPE) Paper No. 19571) and ("Development of a Whirl Resistant Bit"—Thomas M. Warren, J. Ford Brett and L. Allen Sinor; SPE Paper No. 19572) such that a high imbalance force typical for bits at the time could be directed at a large low friction pad. This effect is similar to that used in gun drilling. Bits using this technique are commonly known as "Anti-Whirl" bits.

Other ways of controlling bit whirl include various forms of cutting structures mounted upon the body of the drill bit. These were developed such that a larger ridge is produced in the rock between cutters. This technique is typically known as "Tracking" and is detailed by Weaver et al ("A new PDC cutting structure improves bit stabilization and extends application into harder rock types"—G. E. Weaver and R. I. Clayton. SPE Paper No. 25734), and Mensa-Wilmot et al ("Innovative cutting structure improves stability and penetration rate of PDC bits without sacrificing durability"—Graham Mensa-Wilmot, Tony Krepp, SPE Paper No. 39310).

These, and many other related methods have been shown to be effective to an extent, but the effects of bit whirl are still evident in fixed cutter drill bits, and are still a significant cause for poor bit performance. Nonetheless, the understanding of bit whirl has generally improved the performance of fixed cutter drill bits.

BRIEF SUMMARY OF THE INVENTION

In one embodiment, the invention is both a method of calculating the regenerative force of a PDC drill bit and a method of comparing the relative magnitudes of the regenerative forces of a number of PDC drill bits in order to develop more laterally stable PDC bits.

The regenerative force at a selected point on the outer diameter of a drill bit may be expressed at that diametrical location in units of force for a rock type having a known compressive strength at a given lateral displacement of the drill bit. Alternately, the regenerative force may be expressed as a non-dimensional number representative of the above variables. The total regenerative force is the vector sum of all the forces acting on the formation engaging cutters of the drill bit as it is displaced in the rock in this manner. Regenerative force is well known in the industry. To avoid ambiguity, however, the term 'regenerative force' in this application is intended to be used as described in the above referenced SPE paper 19571.

The regenerative force of a specific bit may be calculated at a particular location on the outer diameter of the bit and compared during design iterations. Specific characteristics of the cutters on the bits such as cutter back rake angle, cutter side rake angle, cutter diameter, cutter 'density', spiral order of the cutters, tracking relationship of the cutter, etc are varied. Also, a number of specific characteristics of the geometry of the bits, such as blade curvature, blade offset, blade start radius, and the number of blades, etc. may be varied. In making these selections, designers must also consider other aspects of the bit design such as durability, aggressivity and steerability, else the resulting bit may not be suitable for drilling a borehole. After each design iteration, the regenerative forces are re-calculated and compared to the previous values. The iteration is repeated until a useful bit design yielding the lowest regenerative forces on the bit is achieved.

Preferably, the regenerative force calculated on at least six spaced locations on the outer bit diameter are used for comparison of the bit designs; more preferably the mean and standard deviation of these regenerative forces are used to compare the bit designs as they are iterated. Preferably the sum of the standard deviation and the mean of the regenerative force are used for comparison. For practical purposes, the diameter range of fixed cutter drill bits according this invention are bits from 3 to 30 inches in diameter.

This results in a fixed cutter earth boring drill bit having very low regenerative forces. The bit has a diameter greater than 3 inches and less than 30 inches and a longitudinal axis, and comprising a pin end, a cutting end and a plurality of formation engaging cutter elements on the cutting end. The regenerative forces divided by the diameter calculated on at least six spaced points of the outer diameter have a mean and a standard deviation. Preferably, the mean plus the standard deviation is less than 120 lbs force per inch of diameter. For bits with a nose diameter at less than 90% of the bit diameter, the mean plus the standard deviation is more preferably less than 50 lbs force per inch of bit diameter. The regenerative force is calculated by displacing the center of the bit 1 mm in a direction normal to the regenerative force, and that the unconfined compressive strength of the rock is assumed, for comparison purposes, to be 11,000 psi.

The accompanying method for designing a fixed cutter earth boring drill bit having a diameter greater than 3 inches and less than 30 inches; and a longitudinal axis, and comprising a pin end, a cutting end and a plurality of cutting elements on the cutting end has the following steps. Arranging the cutting elements at locations on the cutting end of the bit. Calculating regenerative forces divided by the bit diameter calculated on at least six spaced points of the outer diameter. Calculating a mean and a standard deviation of the regenerative forces at the minimum of six spaced points on the diameter. Calculating the sum of the mean and the standard deviation. And re-arranging the cutting elements on the cutting end of the bit and repeating the above steps if the sum is greater than a predetermined value. The preferred value of this force is 120 lbs. force per inch of bit diameter. Again, the regenerative force is calculated by displacing the center of the bit 1.00 mm in a direction and taking the vector sum of all the forces acting on the formation engaging cutters normal to the displacement. The unconfined compressive strength of the rock to achieve the less than 120 lbs force per inch of diameter with a 1.00 mm displacement, as expressed above, is again assumed to be 11,000 psi.

Once the optimum combination of bit and cutter characteristics are achieved, the design of the bit may be finalized and proceed into manufacture.

This invention is also a method of comparing the relative lateral stability among drill bits (that is, the tendency for a bit to whirl). This allows improved bit selection in applications where whirl is apparent. Because there will likely be many different acceptable bit designs produced by the above method, the comparison of the regenerative forces among these bits allows a customer to make a more informed choice between stability and other performance features among a range of bit designs.

Also, because there is a limit to the ranges of the above characteristics available to vary by the designer, the final design is usually a 'best' compromise to provide the lowest regenerative forces on the bit and to also to provide a bit that will drill a proper borehole with acceptable life and performance.

BRIEF DESCRIPTION OF THE DRAWINGS

FIG. 5 is a stacked bar chart showing the index ranges of regenerative forces represented over five ranges of bit diameters.

DETAILED DESCRIPTION OF THE INVENTION AND THE PREFERRED EMBODIMENT

Figure 1:
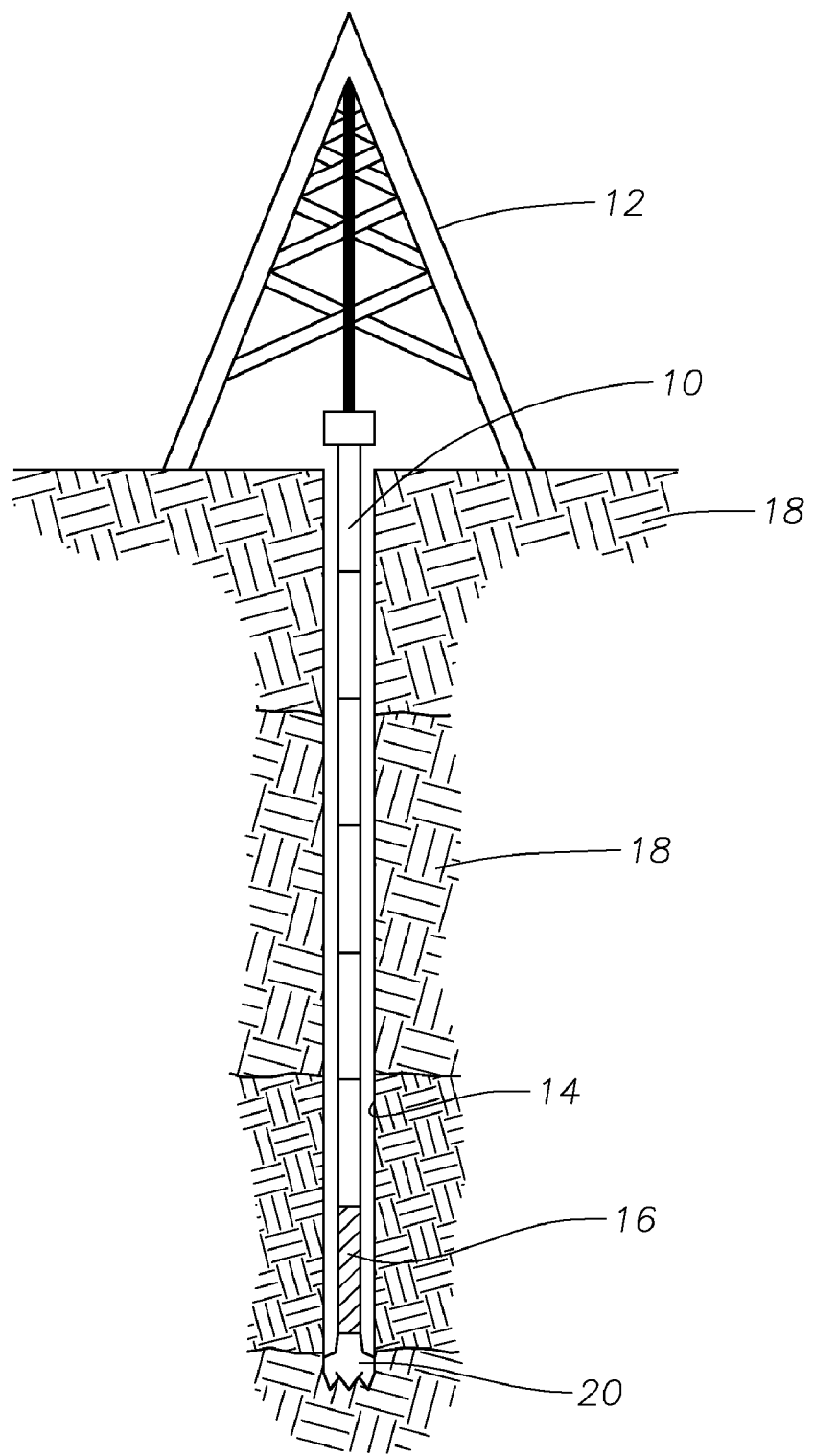
FIG. 1 is a diagrammatic section view arrangement of a drilling rig on the surface of the earth and components typically associated with operating the drill bit of the present invention.

FIG. 1 shows a drill string 10 suspended by a derrick 12 for drilling a borehole 14 into the earth 18 for minerals exploration and recovery, particularly petroleum and natural gas. A bottom-hole assembly (BHA) 16 is located in the drill string 10 at the bottom of the borehole 14. The BHA 16 includes a fixed cutter drill bit 20 (shown in more detail in FIGS. 2 and 3) having a bit body 22, a leading face 24, and a gauge region 26. The drill bit 20 is caused to rotate downhole as it penetrates into the earth allowing the drill string 10 to advance, forming the borehole 14.

The fixed cutter drill bit 20 is designed with predictable stability, that is, the bit is designed such that its tendency to 'whirl' is predicted in advance so that its properties in operation can be matched to the drilling requirements. Although it is generally believed that the less 'whirl' a bit has, the better, there are circumstances where there is a trade off between 'whirl' tendency and drilling rate of penetration performance. In these instances, it may be desirable to provide a bit that 'whirls' a known amount more than the achievable minimum in order to deliver a better overall drilling performance. There are many forms and sizes of fixed cutter drill bits 20. However, it has been found that the present invention is operable for fixed cutter drill bits 20 typically used in well bore drilling as described above having borehole diameters between 3 inches and 30 inches.

Figure 2:
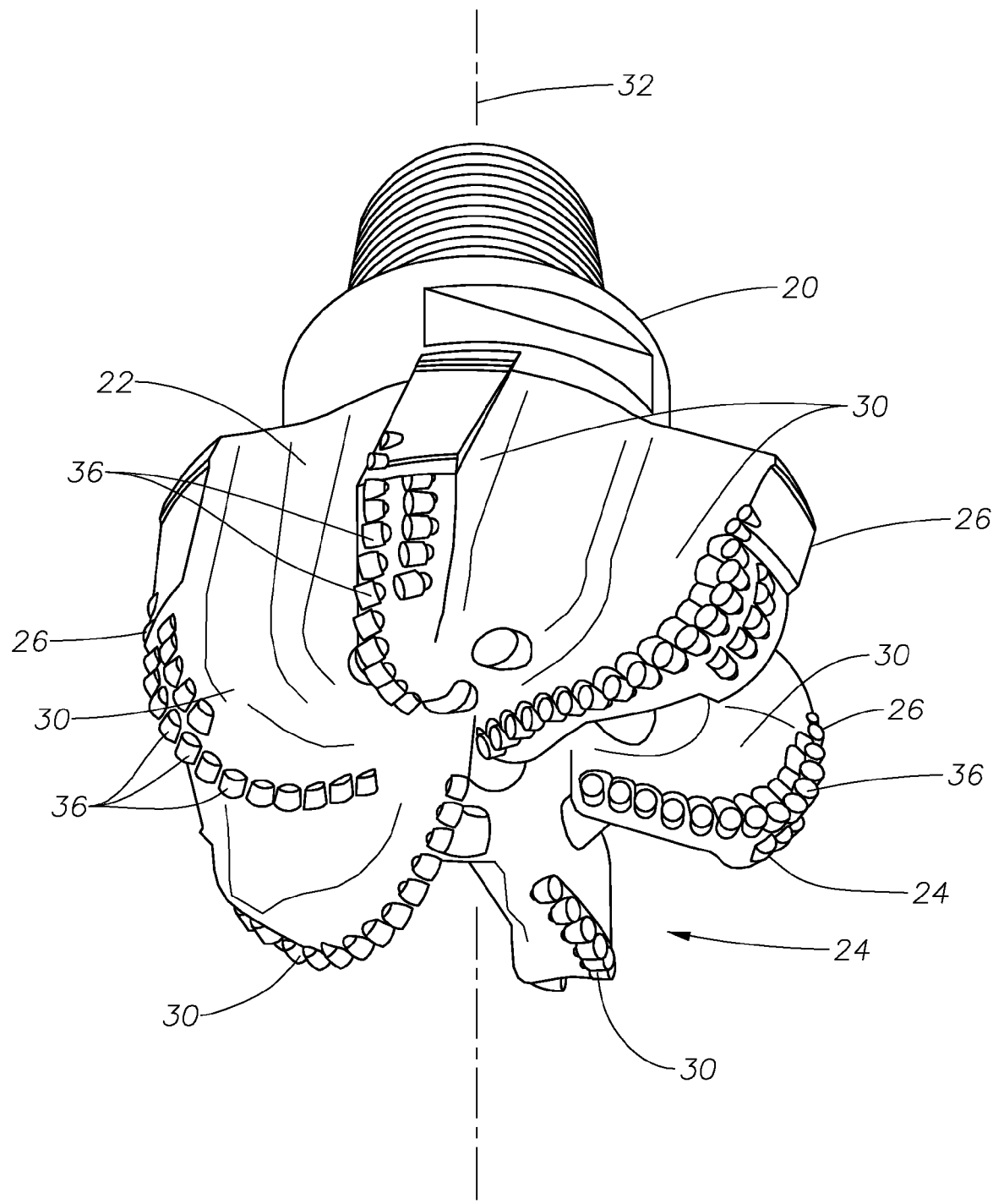
FIG. 2 is a perspective view of a drill bit made in accordance with the present invention.
Figure 3:
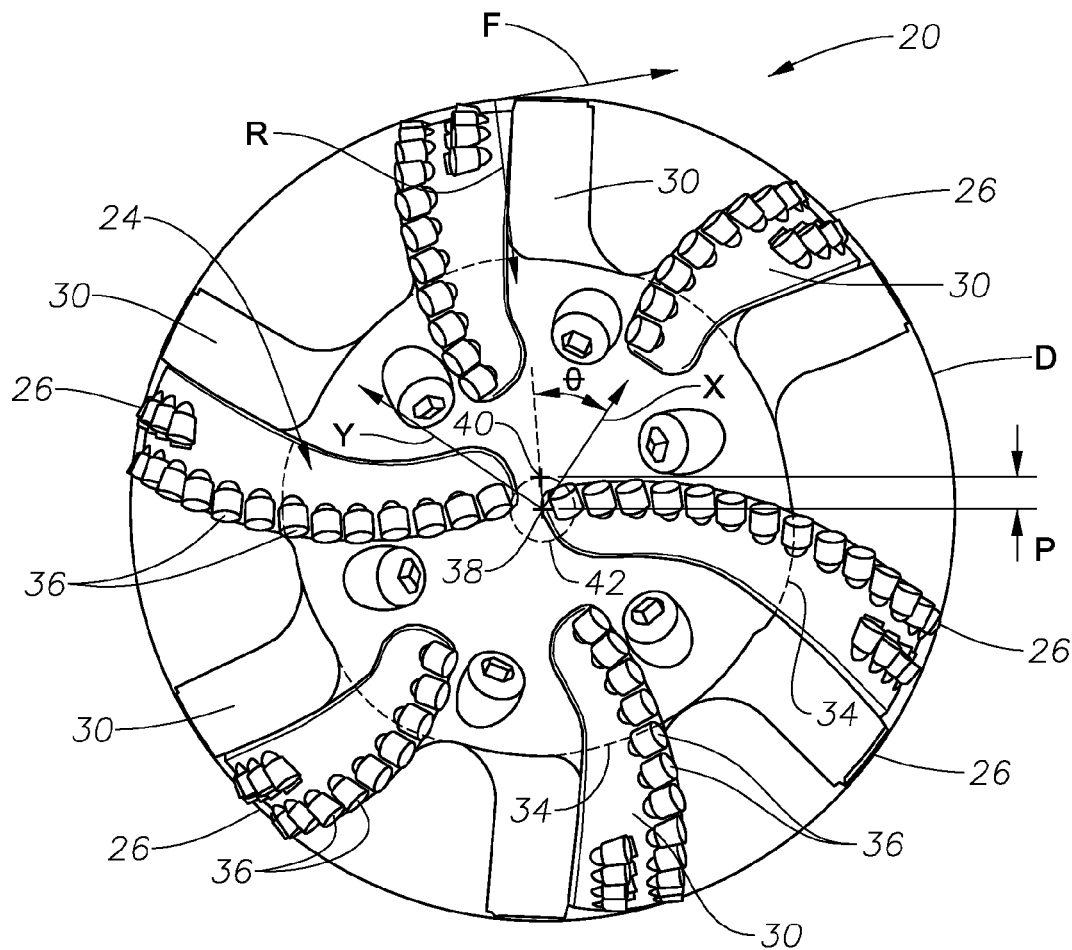
FIG. 3 is an end view of the drill bit of FIG. 2.

Referring now to FIGS. 2 and 3, the bit body 22 of the drill bit 20 is formed with a plurality of blades 30 extending generally outwardly away from the central longitudinal axis of rotation 32 which passes through the center 38 of the drill bit 20 to a bit of diameter D. Spaced apart side-by-side along the leading face 24 of each blade 30 is a plurality of the PCD cutting elements 36. For the purposes of this specification, the term 'cutting elements' is meant to be those formation engaging cutting elements 36 that penetrate into and/or are exposed to, and engage the formation being drilled during normal drilling operations. Excluded are PCD elements used for gauge bearing elements, or cutting elements which only engage the formation during specialized drilling events, such as when the bit is 'side tracking', or changing the orientation of the borehole, such as in building or dropping 'angle' as is common in directional drilling.

The 'nose' of the bit 20 is generally the region between the central portion (or "cone") and the outer flank of the leading face 24 of the bit body 22. It has a nose diameter 34 typically defined along the mean radius of the region.

Typically, the PCD cutting elements 36 have a body in the form of a circular tablet having a thin front facing table of diamond, bonded in a high-pressure high-temperature press to a substrate of less hard material such as cemented tungsten carbide or other metallic material. The cutting elements 36 are typically preformed and then typically bonded on a generally cylindrical carrier which is also formed from cemented tungsten carbide, or may alternatively be attached directly to the blade.

The PCD cutting elements 36 are typically arranged along the blades 30 of the bit body 22 and typically have a geometric arrangement with respect to the earth 18 being drilled. One part of this geometric arrangement describes the orientation of a cutting element 36 as it is driven in a generally circular path through the earth and include backrake angle, siderake angle, cutter diameter, cutter height, cutter 'density', spiral order of the cutter, and tracking relationship of the cutter. Each of these parameters are well known to those skilled in the art of fixed cutter drill bit design, and as described for example, in U.S. Pat. Nos. 6,427,792; 6,248,447; 6,151,960; 6,131,678; 6,123,161; 6,092,613; 6,089,336; 6,065,554; 5,992,549 all incorporated by reference herein for all they contain.

Another part of this geometric arrangement is the orientation of the blades 30 upon which the cutters 36 are mounted. These are typically blade curvature, blade offset, blade start radius, and blade number. Again, each of these parameters are well known to those skilled in the art of fixed cutter drill bit design.

One aspect of the present invention is a method of representing the likelihood of a PDC bit to initiate bit whirl.

Referring to FIG. 3, Brett et al ("Bit Whirl—A New Theory of PDC Bit Failure"—J. Ford Brett, Thomas M. Warren, Suzanne M. Behr SPE19571) observed that when a PDC bit is displaced a distance P off its center 38 the forces generated by the cutting elements 36 and the bit body 22 can be resolved into a restoring force, R, which works to push the bit back towards its center 38 (which lies upon the longitudinal axis 32), and a regenerative force, F, that works to maintain the whirling motion of the bit.

The regenerative force, F, can be utilized in the design of fixed cutter drill bits 20. As shown in FIG. 3 the drill bit 20 is displaced a distance, P, off its center 38, to a point 40, at an angle, theta, from an arbitrary X axis and Y axis that intersect the central longitudinal axis of rotation 32 of the drill bit 20. When the bit 20 is displaced in this manner, a computer program, such as that described by Jelley, et al. in U.S. Pat. No. 6,246,974 incorporated by reference herein for all it discloses, can be used to calculate the restoring force, R and the regenerative force, F. One aspect of the present invention is a method in which this calculation is repeated at a number of steps, N, of the angle theta as it traverses from 0 to 360 degrees about the central longitudinal axis of rotation 32, such that the regenerative forces (represented for convenience as F1, F2, F3, F4, . . . FN) for a displacement at any number N of values of angle theta from 0 degrees to approaching 360 degrees around the drill bit 20 can be calculated. As angle theta traverses about the center 38 of the drill bit 20 it scribes a circle 42 for each subsequent location of the displacement P.

This series of regenerative forces F is then used to compare the likelihood of a PDC bit to commence whirling. This method holds that low overall values of regenerative forces F will result in a bit that is less likely to commence bit whirl, and high overall values of regenerative force F will result in a bit that is more likely to whirl.

In one embodiment of the present invention for a drill bit 20 having a minimum amount of whirling, the regenerative forces F1, F2, F3 . . . FN divided by the bit diameter D calculated on at least six spaced points of the diameter D have a calculated mean and a calculated standard deviation, where the sum of the mean and the standard deviation is less than 120 lbs force per inch of diameter D. Each regenerative force F is calculated by displacing the center of the bit 1.00 mm in the direction normal to the calculated regenerative force, F, and it is assumed for this calculation that the unconfined compressive strength of the rock is 11,000 psi.

In order to visually represent and rank the relative likelihood of a number of PDC bits to initiate whirl, the regenerative forces can be converted into a ranking by the use of a look up table based on the diameter of the bit, as illustrated in FIG. 5. For convenience level 10 is the range of regenerative forces index values which are lowest, and 1 are the highest. As indicated in FIG. 5, numeral 44 indicates level 10, numeral 46 indicates level 9, numeral 48 indicates level 8, numeral 50 indicates level 7, numeral 52 indicates level 6, numeral 54 indicates level 5, numeral 56 indicates level 4, numeral 58 indicates level 3, numeral 60 indicates level 2, and numeral 62 indicates level 1.

With a displacement P of 1.00 mm and with a rock strength of 11,000 psi the average range of the value of regenerative force F is around 40-50 pounds-force per inch of bit diameter for each of the indices, but this varies somewhat with bit type and diameter. Furthermore, since drill bits tend to be made with discrete groups of features, mappings of the regenerative forces to the index number is not intended to be equal, as is evidenced by the irregularity of the spacings of the indices as shown in FIG. 5. The indices shown in FIG. 5 are based upon the known characteristics of the regenerative forces F but are modified according to experience and perceived bit operation behavior.

Figure 4:
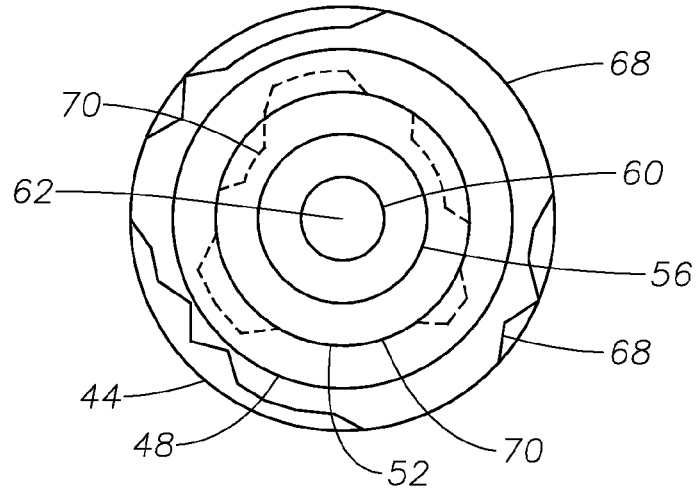
FIG. 4 is a pictorial representation of orbit diagrams which may be used to practice the invention.

Once the series of values of the regenerative force F has been converted into a ranking series, this series can be plotted on an orbit diagram in the manner shown in FIG. 4, where each point represents the stability ranking of the bit when the bit is displaced by the distance, P, at a particular angle theta around the bit 20. In FIG. 4, the relative stability of two bits is plotted, one illustrated by numeral 68 (the solid line), the other illustrated by numeral 70, the dashed line. For clarity, only levels 10, 8, 6, 4, 2, and 1 (as represented by numerals 44, 48, 52, 56, 60, and 62) are shown for this particular illustration. In the preferred embodiment of the invention, the likelihood of the bit to initiate whirl is given a ranking between 1 and 10, where 1 is extremely likely to whirl, and 10 is extremely unlikely to whirl. In the case of FIG. 4, it can be seen that the bit represented by the solid black line 68 is predicted to be less likely to initiate whirl than the bit represented by the dashed line, 70.

It is intended that the display shown in FIG. 4 represents a method of evaluating the stability of a bit by numerically displacing it from its drilling center at a number of angular increments around its face and visually presenting the results as a collective 'whirl index'. It also represents a method of converting the forces generated at these incremental angular displacements into non-dimensional, comparative indices, so that an informed comparison can be made between the relative likelihood of two or more PDC drill bits to initiate bit whirl.

Whereas the present invention has been described in particular relation to the drawings attached hereto, it should be understood that other and further modifications apart from those shown or suggested herein, may be made within the scope and spirit of the present invention.

What is claimed is:

1. A computer implemented method of evaluating the comparative stabilities of a plurality of drill bits, each of the drill bits comprising a bit diameter, a drilling center, a longitudinal axis through the drilling center, a pin end, a cutting end and an arrangement of cutting elements on the cutting end, for design of a drill bit, comprising the steps of:
   mathematically displacing each drill bit from its drilling center at a number of angular increments around each bit diameter,
   calculating a stability index number for each bit at each increment, and
   displaying values of the stability index for each bit as connected lines at similar angular increments on an orbit diagram;
   and further comprising the step of calculating a plurality of regenerative forces about the diameter of the drill bit normal to a 1.00 mm displacement of the longitudinal axis of the bit drilling in an earth formation material having an unconfined compressive strength of 11,000 psi;
   wherein the cutting elements on the cutting end of the designed drill bit are arranged such that the regenerative forces for at least six generally evenly spaced points on the bit diameter have a mean value summed with a standard deviation value totaling less than about 120 lbs force per inch of bit diameter.

2. The method of evaluating the comparative stabilities of a plurality of drill bits of claim 1 further comprising the step of repeating each of the steps for each of a plurality of the bit diameters regularly spaced between 3 and 30 inches.

3. The method of evaluating the comparative stabilities of a plurality of drill bits of claim 1 wherein each of the regenerative forces is calculated by taking the vector sum of all the forces acting on the earth formation normal to the displacement.

4. The method of evaluating the comparative stabilities of a plurality of drill bits of claim 1 wherein the drill bit has a nose diameter less than 90% of the bit diameter, and the mean plus the standard deviation is less than 50 lbs force per inch of bit diameter.

5. The method of evaluating the comparative stabilities of a plurality of drill bits of claim 4 wherein the bit diameter is between 3 and 30 inches.

6. The method of evaluating the comparative stabilities of a plurality of drill bits of claim 4 wherein each of the regenerative forces is calculated by taking the vector sum of all the forces acting on the formation normal to the displacement.

* * * * *